United States Patent [19]

Boyle et al.

[11] 3,854,374

[45] Dec. 17, 1974

[54] QUICK-RELEASE STANDOFF AND SUPPORT DEVICE

[75] Inventors: Jamie N. Boyle; Edmund C. Decker, Jr., both of Phoenix, Ariz.

[73] Assignee: Honeywell Information Systems, Inc., Waltham, Mass.

[22] Filed: May 29, 1973

[21] Appl. No.: 364,990

[52] U.S. Cl..................... 85/84, 85/5 R, 174/138 D
[51] Int. Cl............................................ F16b 13/04
[58] Field of Search .............. 85/83, 84, 80, 81, 70, 85/77, 5 R; 174/138 D; 24/73 P, 73 PF

[56] References Cited
UNITED STATES PATENTS

| | | | |
|---|---|---|---|
| 2,668,468 | 2/1954 | Flogaus................................. | 85/84 |
| 2,853,913 | 9/1958 | Rapata................................. | 85/5 R |
| 3,385,157 | 5/1968 | Rapada................................. | 85/72 |
| 3,606,814 | 9/1971 | MacKenzie.......................... | 85/84 |
| 3,650,173 | 3/1972 | Mathe................................... | 85/81 |

FOREIGN PATENTS OR APPLICATIONS

| | | | |
|---|---|---|---|
| 682,104 | 2/1965 | Italy...................................... | 85/83 |

*Primary Examiner*—Edward C. Allen
*Attorney, Agent, or Firm*—Edward W. Hughes; Edward A. Gerlaugh; Walter W. Nielsen

[57] ABSTRACT

A quick-release standoff and support device for mounting a panel member generally parallel with and spaced apart from a structural member and comprising a tubular body member affixed in an aperture of the panel and having a fastener adapted for insertion in an aperture of the structural member. A locking pin slidably carried within the body member and engageable in the fastener distends the fastener upon insertion therein, causing the fastener to frictionally engage and positively grip the structural member. Components such as switches and indicators affixed to the spaced-apart panel may protrude through the structural member through apertures therein or be visible from the side of the structural member opposite the panel, thus providing physical and visual access to the components. Means are provided for quickly and easily disengaging the locking pin thereby releasing the spaced-apart panel from the structural member to facilitate replacement or repair of the components affixed to the panel.

1 Claim, 8 Drawing Figures

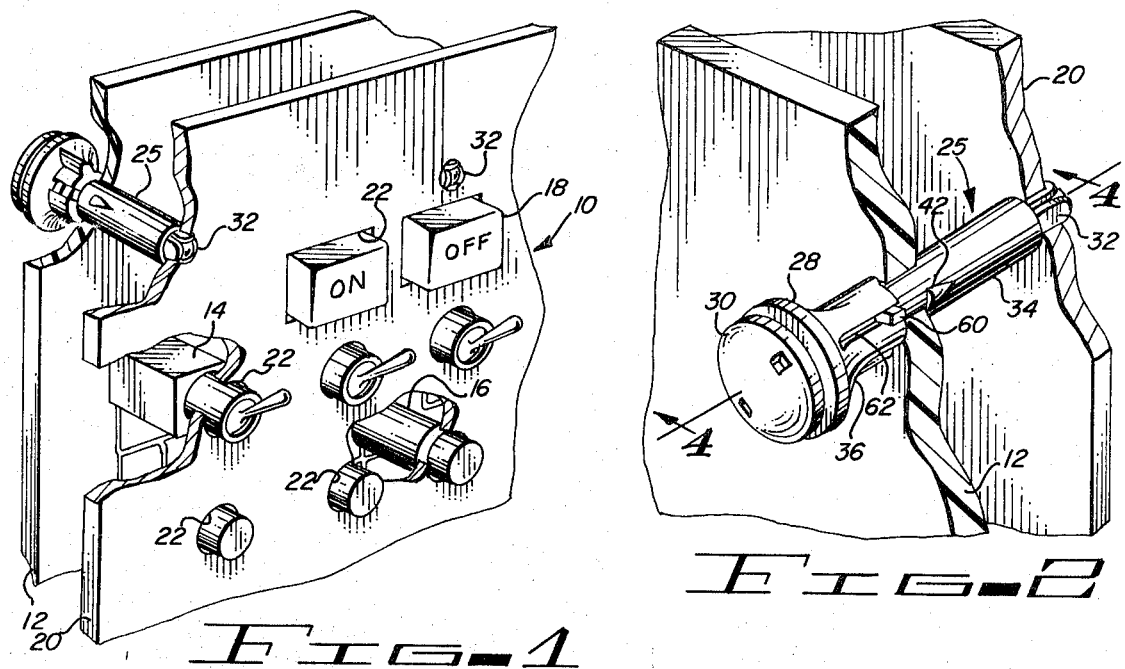
Fig-1
Fig-2
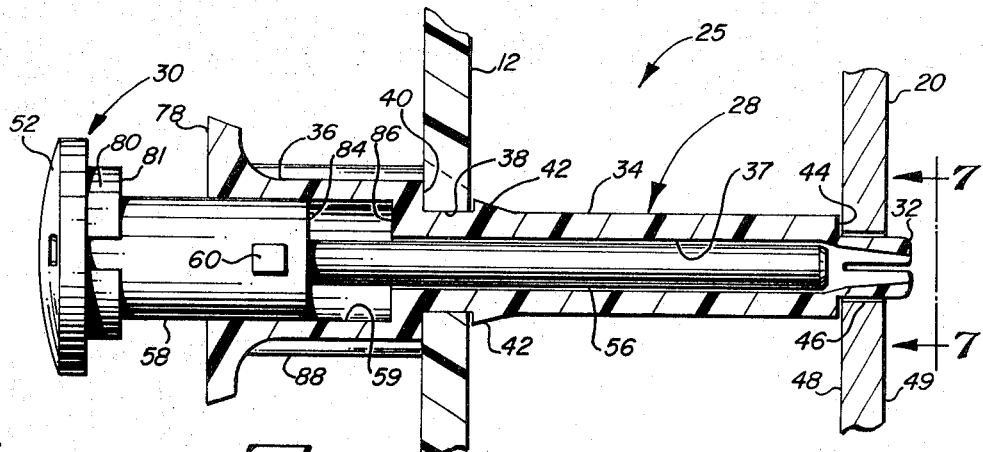
Fig-3
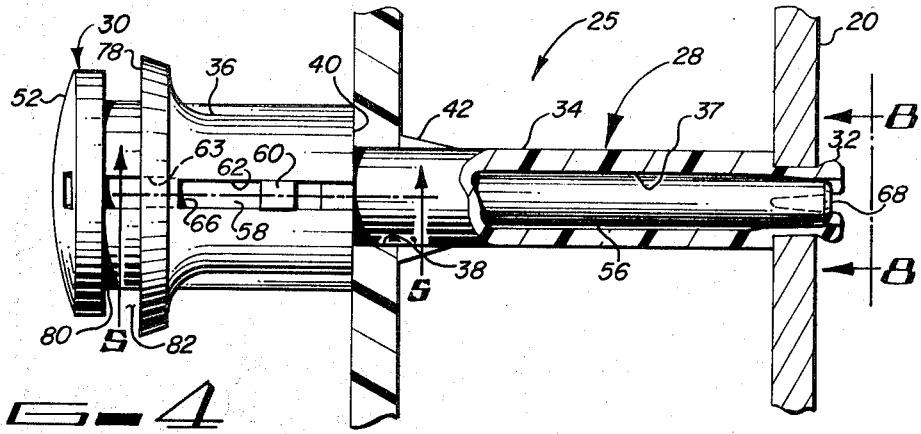
Fig-4

3,854,374

QUICK-RELEASE STANDOFF AND SUPPORT DEVICE

BACKGROUND OF THE INVENTION

Complex electronic equipment normally is provided with man-machine interface facilities in the form of operator consoles, and maintenance and display panels. Electronic digital computers and the associated peripheral equipments comprising a data processing system are particularly adaptable for the display and input of binary information, as evidenced by the well-known theatrical characterization of a computer as a wall of blinking lights and pushbuttons. Advances in microelectronics and the attendant increase of functional capability per unit volume of the equipment has placed severe design constraints upon the circuit interconnection and support hardware associated with display and input components. As the size of the functional components in electronic equipment is continually reduced and the quantity of components utilized for each unit is increased, the density of the man-machine interface components per unit area of the display panel and the density of the electrical interconnections for the interface components becomes extremely high. Accordingly, hand assembly of the man-machine interface facilities becomes more costly and maintainability more difficult.

1. Field of the Invention

The invention relates to support devices, and, more particularly, to a specially mounted and attached quick-release standoff and support device affixed to a panel member and engageable in an aperture of a structural member for attaching the panel to the structural member spaced apart therefrom and in generally parallel relationship therewith.

2. Description of the Prior Art

In the past, indicators, lights and switches were individually affixed to sheet metal display panels utilizing threaded fastening hardware. The display panels generally were an integral part of the cabinet structure, the individual components affixed thereto through apertures in the panel. Alternatively, special housings formed as an integral part of the components were threaded, clipped or press fitted into apertures in the panel, thereby affixing the component to the panel. In order to repair or replace defective components, it was often necessary to attack a jungle of wiring behind the component display panel.

Operator, maintenance and display panels generally are assemblies of individual, miniature discrete components. They are manufactured by placing the miniature elements — light-emitting diodes (LED), liquid crystal display, rotary and toggle switches, push-button switches, indicators, combinations thereof, etc. — parallel to one another and perpendicular both to the plane of the display panel and the plane of interconnection. The interconnection may be through wire joined to the component terminals, or it may be more complex and compact, as by printed circuit board (PCB).

The use of PCB's, and more recently multilayer PCB's with man-machine interface components mounted thereon or formed directly therein, facilitated increased density of components but made access to the components even more difficult. In order to mount the PCB and the components affixed or soldered thereto spaced apart from the structural display panel, spacers with threaded fasteners were utilized in the prior art. Threaded fasteners are inherently more expensive to manufacture and assemble than threadless plastic fasteners, and with threaded fasteners time-consuming disassembly and reassembly of the attachment hardware is required to access a defective component.

Prior art plastic snap fasteners which supply the holding force required to support relatively heavy panel assemblies (as opposed to individual components or smaller subpanels having only a few components thereon) are not easily disengaged. The force required to disengage such fasteners or the panel they support may even crack or break the panel.

SUMMARY OF THE INVENTION

It is, therefore, a broad object of the invention to provide an improved standoff and support device.

It is a more specific object of the invention to provide a low cost, quick-release fastener for supporting components spaced apart from a structural member.

It is a further object of the invention to provide an inexpensive, threadless fastener capable of supporting relatively heavy panel assemblies, and yet capable of being quickly and easily engaged and disengaged without damaging the panel or the support device.

It is another object of the invention to provide a panel standoff and support device having a resilient quick-release fastener on which a locking pin is employed to expand a tapered, slotted annular wall within an aperture of a structural member to frictionally engage and positively grip the structural member through the entire thickness thereof, thus facilitating the positive support of heavy panel assemblies.

It is another object of the invention to provide an inexpensive, threadless fastening member for mounting a component panel spaced apart and in general parallel relationship with a structural member of a display console or cabinet, which fastening member is capable of being quickly released from the structural member to facilitate access to and repair of the panel and the components mounted thereon.

It is a further object of the invention to provide an improved standoff and support device which facilitates high-volume low cost attachment and simultaneous interconnection of a plurality of man-machine interface components to a PCB with mass production techniques, by providing a means for supporting the panel-mounted components at a fixed distance from the plane of display thereby emulating the originally intended position of the components mounted to a structural member.

These and other objects are achieved in accordance with the invention claimed by providing a device which is particularly suitable for supporting a panel assembly spaced apart from another panel or structural member in electronic equipment. The panel standoff and support of the present invention is a threadless device which is inexpensively fabricated from a suitable plastic material, and easily installed by hand without the aid of tools. The device comprises two pieces, a body member and a graspable locking pin, slidably interlocked to form a single unit wherein the pin is reciprocally movable in the body member. The body member is affixed to the panel assembly in an aperture of the panel. A central, longitudinally extending passage in the body member carries the locking pin. A fastener at one end of the body member is inserted into an aperture of the structural member, the locking pin being disengaged from the passage traversing the fastener prior to insertion of the fastener. The fastener comprises a thin resilient annular wall having slots therein, and is provided with an internal taper which constricts the passage therethrough. By pushing the locking pin into the constricted passage traversing the fastener, the tapered annular wall of the fastener is elastically expanded and deformed outwardly under pressure from the pin, locking the fastener into the aperture of the structural member. Means for quickly and easily disengaging the locking pin are provided. When the graspable locking pin is disengaged from the fastener, the deformation pressure ceases and the slotted annular wall resumes substantially its normal shape thus facilitating removal of the device from the aperture of the structural member.

The panel assembly, utilizing the device of the present invention, can thus be rapidly locked in position on a structural member, and quickly and easily disengaged to permit access to the panel assembly and the components mounted thereon.

BRIEF DESCRIPTION OF THE DRAWINGS

The invention is pointed out with particularity in the appended claims, however, other features of the invention will become more apparent and the invention will be best understood by referring to the following detailed description in conjunction with the accompanying drawings in which:

FIG. 1 is a fragmentary isometric view of a panel assembly cut away to show the quick-release standoff and support device of the present invention.

FIG. 2 is another view of the standoff and support device of the present invention locked to a structural member.

FIG. 3 is an enlarged side view in section of the panel standoff and support of the present invention showing the fastener inserted into an aperture of a structural member with the locking pin disengaged.

FIG. 4 is an enlarged section view taken along the lines 4—4 of FIG. 2.

DESCRIPTION OF THE PREFERRED EMBODIMENT

Figure 5:
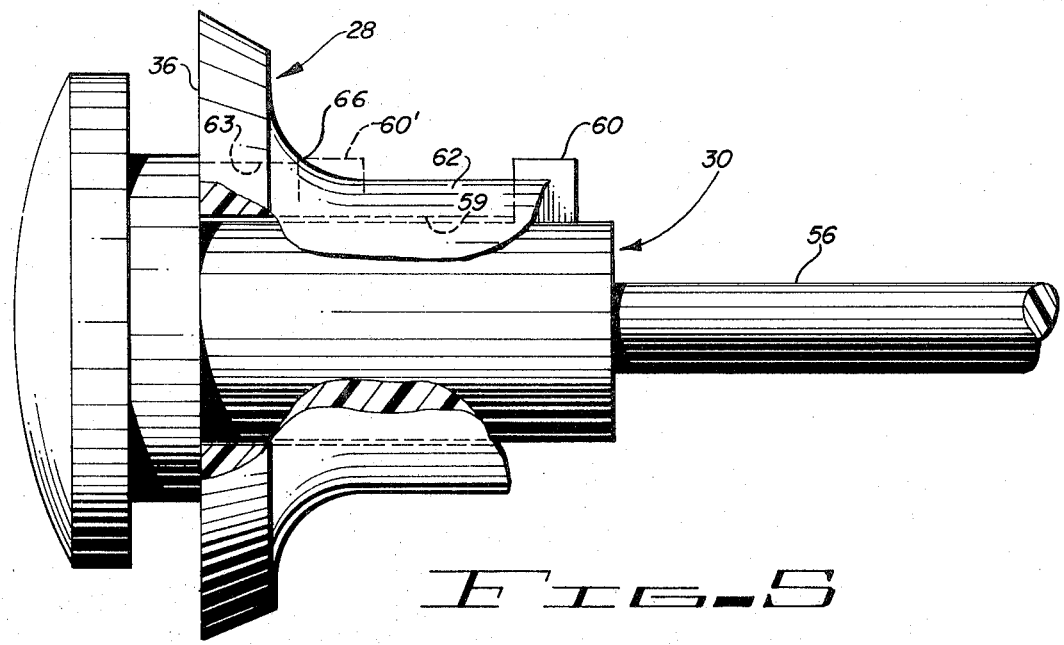
FIG. 5 is a detail view taken along lines 5—5 of FIG. 4.

Referring now to FIG. 1, the general features and elements of a display panel assembly 10 are shown including a panel member 12 having components such as toggle switches 14, light emitting indicators 16, and indicator/switch combinations 18 affixed to the panel 12. The panel member 12 is generally parallel with and spaced apart from a structural member 20 which may be the external feature of an electronic equipment cabinet (not shown). Although the structural member 20 is shown as a sheet of metal, it may also be a plastic material such as epoxy or polyester-glass laminate, polystyrene, or the like. The components 14–18 protrude through component apertures 22 provided in the structural member 20. The visual indicator components may alternatively be visible through transparent or translucent portions of the structural member 20. The panel member 12 may be a multilayer printed circuit board (PCB) to facilitate electrical interconnection of the components 14–18 with the remainder of the electronic system which the components service. Other components (not shown) such as lamp drivers and logic circuits — either discrete component type or monolithic integrated circuit modules — may be mounted on the panel member 12. The components 14–18 are aligned generally parallel with one another and perpendicular both to the plane of interconnection 12 and to the plane of display 20. The components 14–18, supported by the PCB 12, fit loosely in the component apertures 22 and receive no primary support from the structural member 20. A standoff and support device 25 holds the panel member 12 spaced apart from the structural member 20.

The standoff and support device 25, see FIGS. 2 and 3, comprises two slidably interlocked elements, a body member 28 and a plunger or locking pin 30. Both elements 28, 30 are injection molded from a suitable flexible or resilient plastic material in a one-step operation. Cost of tooling and production are thereby reduced, the parts being suitable for production in automatic high speed molding equipment. A variety of plastic materials having high tensile strength and a moderate tensile elastic modulus may be used for fabricating the elements 28, 30. Suitable materials include acetal homopolymer, unfilled polycarbonate, ETFE and ECTFE fluoroplastics, thermoplastic polyester, polysulfone, and polyamide. The material utilized may be reinforced or filled to enhance one or more of its physical properties. The physical properties of the plastic material relating to tensile strength and resilience or elastic modulus largely determine the preference as will be more fully explained later. Considering both cost and performance, however, the preferred material is unmodified type 6/6 nylon.

Referring still to FIG. 3, the body member 28 comprises three axially arranged elements: a fastener 32, a spacer or shank 34, and an enlarged head 36. A passage or bore 37, preferably cylindrical in form, extends axially through the body member 28. The spacer 34 depends axially from the head 36 and is adapted for insertion into and through an aperture or hole 38 of the panel member 12. The spacer 34 is generally tubular in shape and has a diameter less than that of the head 36 from which its depends, thus forming a flange or face 40 which abuts the panel member 12 adjacent the aperture 38 through which the spacer 34 protrudes. A pair of retaining tabs 42 protrude outwardly from the spacer 34 and are adapted, by virtue of the resiliency of the material from which the body member 28 is formed, to compress inwardly as the spacer 34 and tabs 42 pass through the aperture 38, and then spring outwardly as shown in FIGS. 3 and 4 to retain the body member 28 affixed in the aperture 38 of the panel member 12. The panel member 12, described herein as a PCB, may also be a component, a component assembly, a hardware item such as a cable clamp, or any other such item or structure suitable for mounting through an aperture formed therein.

The fastener 32 depends from the tubular spacer 34 and is of smaller diameter than the spacer 34 so as to form a second flange or shoulder 44. The fastener 32 is adapted to be received in and fit an aperture or hole 46 of the structural member 20. The fastener 32 is of sufficient length to extend through the structural member 20 when the shoulder 44 abuts the inner surface 48 thereof, and protrude a short distance beyond the outer surface 49. The term "structural member" utilized herein implies strength for supporting the attached panel member 12. FIGS. 1 and 2 show the structural member 20 as a single planar panel. It is understood that the component display area, which as previously described provides no direct structural support for the displayed components, may be a separate display panel, e.g. thin plastic, attached to the structural member 20. Only the fasteners 32 need be inserted in a structurally solid member.

Referring still to FIG. 3, the plunger or locking pin 30 includes an actuating member 52 and a shaft 56 depending therefrom. The shaft is adapted for slidable engagement into the passage 37 of the body member 28; an enlarged segment 58 of the shaft 56 is received in a correspondingly enlarged portion 59 of the passage 37 traversing the enlarged head 36 of the body member 28. A shaft-travel limit-stop or guide 60 projects laterally outward from the enlarged segment 58 of the shaft 56. The guide 60, see FIG. 4, is engaged in a corresponding longitudinally extending keyway or slot 62 formed in the sidewall of the head 36. The two separately molded elements, body member 28 and locking pin 30, are easily and quickly assembled by sliding the shaft 56 into the passage 37 and forcing the guide 60 into the head 36 through an internal portion 63 of the slot 62. Referring to FIG. 5, the detail of the guide 60 and keyway 62 are shown more clearly. The guide 60 is forced through the internal portion 63 of the slot 62 during assembly of the elements 28, 30 into a single unit. The resiliency of the material, e.g. nylon, utilized to fabricate the device allows flexure of the head 36 facilitating passage of the guide 60 through the opening 63. After assembly, the locking pin 30 is slidably movable in the passage 59 of the body member 28, but is prevented from sliding out of the body member 28 by abutment of the guide 60' against a limit-stop 66 formed in the body member 28 by termination of the internal portion 63 of the keyway 62.

Figure 6:
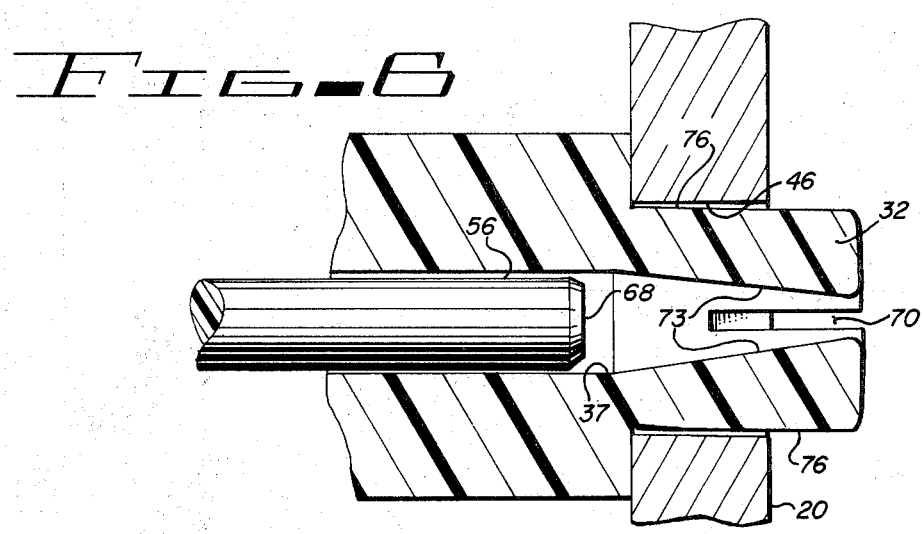
FIG. 6 is an enlarged view of the fastener (locked position) of FIG. 4.
Figures 7, 8:
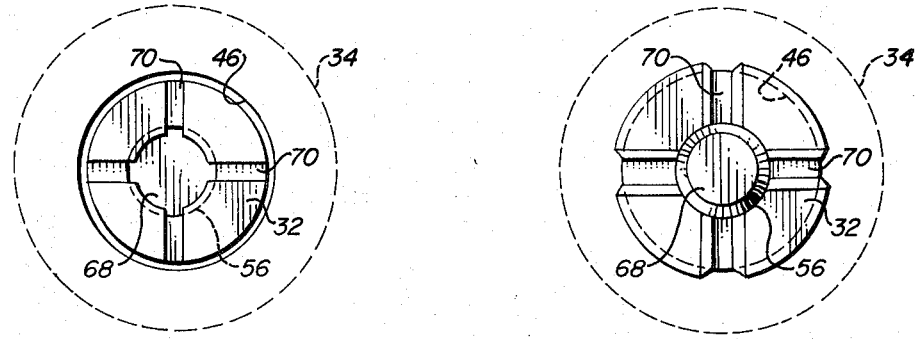
FIGS. 7 and 8 are end views of the fastener taken, respectively, along lines 7—7 and 8—8 of FIGS. 3 and 4, and showing, respectively, the unlocked and locked configurations.

The structure and operation of the fastener 32 is best described with reference to FIGS. 6, 7 and 8. FIG. 6, an enlarged view of the fastener 32 of FIG. 3, shows in greater detail the construction and some of the novel features of the preferred embodiment of the device of the present invention. FIGS. 7 and 8 are end views of the fastener 32 taken, respectively, along lines 7—7, 8—8 of FIGS. 3 and 4. FIGS. 3, 6 and 7 show the fastener in the unlocked position; FIGS. 4 and 8 show the fastener 32 locked in the aperture 46 of the structural member 20.

Referring to FIGS. 6 and 7, the fastener 32 is shown in the unlocked position, the end 68 of the shaft 56 disengaged from the fastener 32. The fastener 32 is molded in the general form of a cylinder or grommet having one or more transverse slots 70 formed therein. The passage 37 traversing the fastener 32 decreases gradually in size to form internal walls 73 having an incline or taper as shown in FIGS. 3 and 6. The external walls 76 of the fastener 32 may also be tapered slightly to aid insertion of the fastener in the aperture 46. The degree of tapering of the external walls 76 must, however, be less than that of the internal walls 73 to insure positive locking through the thickness of the aperture as described hereinafter. The fastener is locked into the aperture 46 of the panel member 20 by applying an external force, as by pushing, to the actuating member 52 (see FIG. 3) of the locking pin 30, thereby forcing or wedging the end 68 of the shaft 56 into the passage 37 traversing the fastener 32 and into frictional engagement with the tapered walls 73. As the shaft 56 passes through the constricted passage or chamber formed by the internal walls 73, the slotted fastener 32 is distended or wedge radially outward such that the external walls 76 of the fastener 32 press or bear positively with substantial force upon the interior of the aperture 46 in the structural member 20, throughout the entire thickness thereof. In addition to the positive locking feature imparted by the slightly tapered internal walls 73, frictional engagement of the shaft 56 in the tapered recess provides a positive and gradually increasing locking feel, when the actuating member 52 (see FIGS. 3 and 4) is pushed to force the locking pin 28 into the fastener 32.

Referring now to FIG. 8 which shows the fastener in the locked position, the slots 70 formed in the fastener 32 promote distention of the portion of the fastener 32 external to the aperture 46 to a size greater than the diameter of the aperture 46. The slots 70 thus aid the locking function of the device, however, the primary function of the slots is one of release rather than locking. Instead of tapered internal walls, the prior art fasteners were formed with a continuous internally protruding annular ring, i.e. without slots, the ring external to the aperture. When expanded by a pin, the distended ring retained the fastener rather than forcibly locking the fastener inside the aperture. Plastic materials inherently cold-flow or creep when distended under pressure for extended periods of time. The prior art fasteners would therefore retain their extended shape and were removed only with great difficulty, and often with damage to the fastener. The slots 70 in the fastener of the present invention permit easy collapse and removal of the fastener 32 from the aperture 46 upon disengagement of the shaft 68, without damaging the fastener 32 structure. The slots 70, thus compensate for the effects of creep or cold-flow during the lifetime of the fastener and enhance the novel quick-release aspect of the fastener and facilitate its repeated reuse.

It is evident from the foregoing discussion that the criteria for material selection include high tensile strength (6–15 thousand psi) and a relatively high tensile elastic modulus (300–500 thousand psi) combined with moderate elongation (25–300 percent) and good creep and cold-flow resistance. Otherwise stated, the material may be selected to provide the best balance of the mechanical characteristics hereinbefore named under the load contemplated. For example, the material should have sufficient tensile strength to support the load carried (i.e., the panel assembly 20) and withstand the pressure and forces applied to the fastener 32 and the adjacent spacer element 34, and yet be sufficiently elastic to preclude rupture when the fastener is expanded.

Referring now to FIGS. 3 and 4, additional features of the present invention will now be explained. When the device 25 is in the unlocked position (FIG. 3) a face or surface 78 of the head 36 provides a convenient positive pressure surface for pushing (with the fingers) the fastener 32 through the aperture 46 of the structural member 20. This feature is particularly important when a plurality of devices 25 are installed on a single panel assembly 12 and slight misalignment of the holes 46 and fasteners 32 due to an accumulation of tolerances may result in resistance to the insertion of the fasteners 32. The surface 78 rather than the panel 12 is utilized for applying insertion pressure, thus precluding damage to the retaining tabs 42.

A spacing member or flange 80 having a diameter intermediate that of the actuating member 52 and the segment 58 may be provided adjacent the actuating member 52. When the device 25 is locked (FIG. 4), the flange 80 provides a surface 81, see FIG. 3, for abutting the surface 78 of the head 36, thus holding the actuating member 58 spaced apart therefrom. The resulting space or annular slot 82, see FIG. 4, is conveniently utilized for inserting a tool such as a coin or screwdriver tip, which when twisted aids in overcoming the frictional resistance to disengagement of the shaft end 68 from the fastener 32. Alternatively, the travel of the plunger element 30 may be limited by abutment of the segment end 84, see FIG. 3, against the bottom end 86 of the internal bore 59 in the head 36. In the latter instance, the spacing member 80 need not be provided. One or more stiffening members 88 may be provided to increase the strength of the head 36.

We have described above the preferred embodiment of a novel standoff and support device which is inexpensively manufactured and quickly and easily installed by hand, without tools. The invention facilitates high-volume low-cost attachment and simultaneous interconnection of a plurality of man-machine interface components to a PCB by mass production flow-solder techniques, and provides a means for supporting the panel-mounted components at a fixed distance from the plane of display thereby emulating the originally intended mounting position of the components. The external appearance of the fastening element is pleasing to the eye, appearing as a countersunk cross-slotted screw head. The device has been utilized to replace more expensive threaded fastening hardware in the maintenance display panels of a line of computer equipment, resulting in a significant reduction of manufacturing and assembly costs. And, since the quick-release feature of the device allows more rapid repair of the equipment in the field, additional savings are realized.

While the principles of the invention have now been made clear in the foregoing description, it will be immediately obvious to those skilled in the art that many modifications of the structure, arrangement, proportions, the elements, material and components may be used in the practice of the invention which are particularly adapted for specific environments without departing from those principles. The appended claims are intended to cover and embrace any such modifications within the limits only of the true spirit and scope of the invention.

What is claimed is:

1. A threadless plastic support device for detachably mounting a panel member to a structural member at a predetermined distance therefrom, said device being attachable in an aperture of the structural member, said device comprising:

a body member and a locking pin carried slidably in said body member;

said body member including a head, a fastener, a spacer arranged axially between the head and the fastener, and a central passage extending through said body member for receiving said locking pin;

said body member insertable in a hole formed in the panel member, the head having a face of greater cross-sectional dimension than the spacer so that the face abuts one surface of the panel member, the spacer passing through the hole and extending for said predetermined distance laterally beyond the surface opposite said one surface;

first means on the spacer for retaining said body member securely in the panel member hole, and further means on the spacer proximate to the fastener and located said predetermined distance along said spacer from said retaining means, said further means engaging one surface of the structural member when the fastener is inserted in the aperture of the structural member, so that said one surface of the structural member is spaced said predetermined distance from said opposite surface of the panel member;

the fastener depending from the spacer and formed in the shape of a grommet having an external wall and an internal wall defining the portion of the central passage traversing the fastener, and fastener having at least one transverse slot segmenting the grommet;

said locking pin including an actuating member with a cylindrical shaft depending therefrom, the actuating member being external of the head, the shaft slidably engageable in the passage traversing the fastener by applying an external force to the actuating member;

a guide on said locking pin receivable in a keyway formed in said body member, the guide and the keyway cooperating to slidably interlock said body member and said locking pin;

the fastener, prior to engagement of the shaft therein, being insertable in and through the aperture of the structural member, the internal wall of the fastener tapered to form a chamber of gradually decreasing size receiving the shaft, the tapered internal wall wedgedly engaged by the shaft to distend the slotted grommet radially outward to frictionally engage and grip the structural member in the aperture thereof and lock said device to the structural member, the spacer holding the panel member fixedly spaced said predetermined distance apart from the structural member; and means for disengaging the shaft from the fastener, including means for limiting the transverse movement of the shaft within the passage of the body member.

* * * * *